United States Patent
Vuong et al.

(10) Patent No.: US 8,595,304 B2
(45) Date of Patent: *Nov. 26, 2013

(54) SYSTEM AND METHOD FOR REVIEWING ATTACHMENT CONTENT ON A MOBILE DEVICE

(75) Inventors: Thanh Vinh Vuong, Kitchener (CA); Olav Sylthe, Atlanta, GA (US); Luis Pablo Estable, Hull (CA)

(73) Assignee: BlackBerry Limited, Waterloo (CA)

(*) Notice: Subject to any disclaimer, the term of this patent is extended or adjusted under 35 U.S.C. 154(b) by 125 days.

This patent is subject to a terminal disclaimer.

(21) Appl. No.: 13/047,249

(22) Filed: Mar. 14, 2011

(65) Prior Publication Data

US 2012/0239754 A1    Sep. 20, 2012
US 2013/0185360 A2    Jul. 18, 2013

Related U.S. Application Data

(63) Continuation of application No. 11/313,426, filed on Dec. 21, 2005, now Pat. No. 7,930,354.

(51) Int. Cl.
G06F 15/16 (2006.01)

(52) U.S. Cl.
USPC ........... 709/206; 709/202; 709/203; 709/201; 709/204

(58) Field of Classification Search
USPC .................... 709/206, 201, 202, 203, 204
See application file for complete search history.

(56) References Cited

U.S. PATENT DOCUMENTS

| | | |
|---|---|---|
| 5,771,355 A | 6/1998 | Kuzma |
| 5,781,901 A | 7/1998 | Kuzma |
| 5,903,723 A | 5/1999 | Beck et al. |
| 6,240,445 B1 | 5/2001 | Kumar et al. |
| 6,546,406 B1 | 4/2003 | DeRose et al. |
| 6,857,102 B1 | 2/2005 | Bickmore et al. |
| 6,915,333 B2 | 7/2005 | Delia et al. |
| 6,990,514 B1 | 1/2006 | Dodrill et al. |
| 7,035,902 B1 * | 4/2006 | Bates et al. ................ 709/206 |
| 7,092,116 B2 | 8/2006 | Calaway |
| 7,107,315 B1 | 9/2006 | Rodriguez et al. |
| 7,143,345 B2 | 11/2006 | McKnight et al. |
| 7,159,039 B1 | 1/2007 | Hahn et al. |
| 7,209,953 B2 | 4/2007 | Brooks |
| 7,269,547 B2 | 9/2007 | Pentheroudakis et al. |
| 7,277,890 B2 | 10/2007 | Sylthe et al. |
| 7,363,582 B2 | 4/2008 | Sylthe et al. |
| 7,412,447 B2 | 8/2008 | Hilbert et al. |
| 7,454,460 B2 | 11/2008 | Ivashin |
| 7,496,191 B1 | 2/2009 | Crews et al. |
| 7,502,783 B2 | 3/2009 | Palmon et al. |
| 7,587,309 B1 | 9/2009 | Rohrs et al. |

(Continued)

FOREIGN PATENT DOCUMENTS

| | | |
|---|---|---|
| WO | 01/13656 A1 | 2/2001 |
| WO | 03/005276 A2 | 1/2003 |
| WO | 2005/034451 A1 | 4/2005 |

*Primary Examiner* — Lan-Dai T Truong

(74) *Attorney, Agent, or Firm* — Novak Druce Connolly Bove + Quigg LLP

(57) ABSTRACT

Messages with an associated attachment document are first delivered to a mobile device without the attachment document. If the mobile device user wishes to review attachment data related to the attachment document, the user submits an attachment processing request to an attachment server that handles the attachment processing requests to provide the attachment data in one of several possible formats to the user.

8 Claims, 8 Drawing Sheets

(56) References Cited

U.S. PATENT DOCUMENTS

| | | |
|---|---|---|
| 8,185,591 B1 * | 5/2012 | Lewis ................ 709/206 |
| 2002/0184317 A1 | 12/2002 | Thankachan |
| 2003/0055907 A1 | 3/2003 | Stiers |
| 2003/0208546 A1 | 11/2003 | DeSalvo et al. |
| 2004/0139397 A1 | 7/2004 | Yuan et al. |
| 2004/0153451 A1 | 8/2004 | Phillips et al. |
| 2006/0117019 A1 | 6/2006 | Sylthe et al. |
| 2006/0242247 A1 | 10/2006 | Richardson |
| 2007/0016636 A1 | 1/2007 | Boerries et al. |
| 2007/0050334 A1 | 3/2007 | Deninger et al. |
| 2007/0118611 A1 | 5/2007 | Buckley et al. |
| 2007/0118612 A1 | 5/2007 | Buckley et al. |
| 2007/0143421 A1 | 6/2007 | Vuong et al. |
| 2008/0092085 A1 | 4/2008 | Yuan et al. |
| 2008/0209314 A1 | 8/2008 | Sylthe et al. |
| 2008/0294729 A1 | 11/2008 | Ionescu et al. |
| 2009/0019389 A1 | 1/2009 | Aust |

* cited by examiner

SYSTEM AND METHOD FOR REVIEWING ATTACHMENT CONTENT ON A MOBILE DEVICE

CROSS REFERENCE TO RELATED APPLICATION

This application is a continuation application of U.S. patent application Ser. No. 11/313,426 filed on Dec. 21, 2005, now U.S. Pat. No. 7,930,354 issued on Apr. 19, 2011 and entitled "System and Method for Reviewing Attachment Content on a Mobile Device," said application is expressly incorporated by reference herein in its entirety.

FIELD

The embodiments described herein relate to handling attachment content on a mobile communication device.

BACKGROUND

Mobile devices that are used for data communication typically include e-mail applications or other messaging applications in which e-mails are received with an associated attachment document. The mobile device typically includes the native application that is required for opening, viewing and possibly modifying and saving the attachment document. For example, if a user receives a Microsoft Word™ document or an Adobe Acrobat™ file in an e-mail on the mobile device, the user can simply open these attachment documents in Microsoft Word and Adobe Acrobat respectively to view and possibly modify these files.

However, to reduce on communication overhead, the attachment is not initially sent with the e-mail message to the mobile device. Rather, an indication that there is an attachment is sent along with the initial delivery of the e-mail message to the mobile device. The user can then send a request to an enterprise server to receive the entire attachment document or a table of contents (if applicable). Indeed, some mobile communication devices use a client-server model to manage attachment documents. A "thin client" or viewer resides on the mobile communication device. A "fatter server" resides elsewhere (possibly remotely) that is used to convert the entire attachment document, using machine conversion, and then embed the attachment document into communication signals that are sent to the mobile communication device. However, straight-forward machine conversion lacks the capacity for user input which is needed for certain attachment documents.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which:

FIG. 3 is a block diagram of an exemplary embodiment of a node of a wireless network that the mobile communication device of FIG. 1 may communicate with;

FIG. 4 is a block diagram of an exemplary embodiment of a host system that the mobile communication device of FIG. 1 may communicate with;

FIG. 7 is a flowchart diagram illustrating an exemplary embodiment of an attachment handling process for handling attachment processing requests; and, FIG. 8 is a block diagram of another exemplary embodiment of a host system that the mobile communication device of FIG. 1 may communicate with.

DETAILED DESCRIPTION

Figure 1:
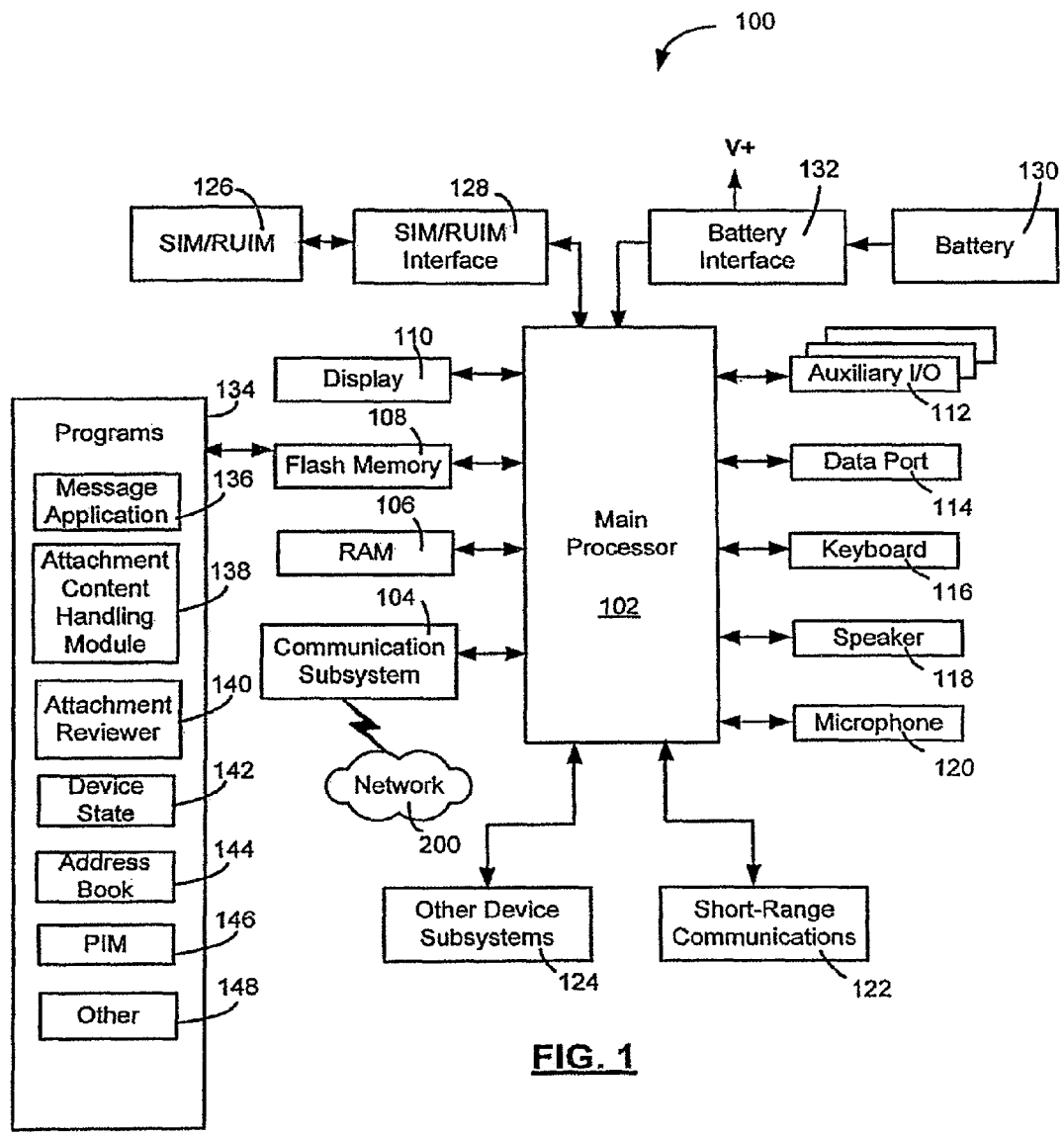
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The conventional machine conversion utilities that are used to process a given attachment document for sending to a mobile device convert all of the data in the given attachment document. However, the conventional machine conversion lacks flexibility, lacks the capacity to accept user input and lacks the ability to handle complex inputs. For example, consider the following scenarios in which the user of a mobile device receives a full conversion of an attachment document and only needs to view a portion of the attachment document:

a) Legal counsel sends a 200 page legal brief and wants the user to review pages 48-50;
b) A sales manager wants the user to review sales numbers on pages 8-10 of a sales report; or,
c) The user is asked to review section 5 on pages 17-19 of a business plan.

With conventional means, all of these scenarios require the user to send the document to an attachment server. The attachment server then converts the document in its entirety and sends back the full attachment document to the user. The user then manually goes through the entire converted attachment document to view the desired section.

One aspect of at least one of the embodiments described herein allows for attachment selection markers to be associated with a given attachment document to indicate one or more desired sections of the given attachment document. The attachment server is then asked to process the given attachment document to provide a selection dataset that corresponds to the one or more desired sections.

In some cases, automatic markers can be used for the attachment selection markers while in other cases manual markers can be used for the attachment selection markers. The manual markers can be entered manually into the attachment document, while the automatic markers can be inserted into a message that is associated with the attachment document. The message and an indication of the attachment document, or an attachment processing request can then be sent to an attachment server for processing. This is described in more detail below.

Yet another aspect of at least one of the embodiments described herein provides the user of the mobile device with choices that are available for handling each attachment document. These choices include the option of full conversion or selection of one or more desired sections of the attachment document identified by attachment selection markers.

In yet another aspect, in at least one of the embodiments described herein, the attachment server may include a tokenizer and a parser for dealing with attachment processing requests. The tokenizer can scan the body of the attachment processing request and can identify, select, and tag various reserved words for further consideration by the parser. The parser can then validate the arrangement of the tokens with respect to rules in a grammar, and upon validation of a given rule, execute the request. The tokenizer and parser are described in more detail below.

The embodiments described herein generally relate to attachment document processing. To facilitate an understanding of the embodiments provided herein, the embodiments will be described in terms of attachment document processing in relation to a mobile wireless communication device, hereafter referred to as a mobile device, that can send and receive wireless messages. Examples of applicable communication devices include cellular phones, cellular smart-phones, wireless organizers, personal digital assistants, computers, laptops, handheld wireless communication devices, wirelessly enabled notebook computers and the like, each of which is capable of receiving messages with attachments.

In general, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation.

The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUN 126 is that a subscriber is not necessarily bound to any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The main processor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136. The message application 136 can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the device 100 such as in a data store of an associated host system that the mobile device 100 communicates with.

The programs 134 also include an attachment content handling module 138 and an attachment reviewer 140. The attachment content handling module 138 allows the user of the mobile device 100 to choose how a particular attachment document is downloaded to the mobile device 100. For instance, the user can request the full content of the attachment document or a selection dataset for the attachment document. In some implementations, the user can request a table of contents for the attachment document if this is applicable. The attachment content handling module 138 works with the message application 136 to provide these different features for each message with an associated attachment document that is received by the mobile device 100. The attachment reviewer 140 enables the user to review the selection dataset requested by the user for the attachment document. In some embodiments, the attachment reviewer 140 includes any application that can be used to review the attachment data. For instance, if the attachment document is a WORD document, then the attachment reviewer 140 can be Microsoft™ Word. If the attachment document is an excel spreadsheet presentation, then the attachment reviewer 140 can be Microsoft™ Excel. If the attachment data is an audio file, then the attachment reviewer 140 can be Quicktime Player™ or Realplayer™ and so on and so forth. In some embodiments, the attachment reviewer 140 can be a multi-platform application that can support various file formats. In some embodiments, the functionality of the attachment content handling module 138 and the attachment reviewer 140 can be combined into one module. The operation of the attachment content handling module 138 and the attachment reviewer 140 is described in further detail below.

The mobile device 100 can further include a device state module 142, an address book 144, a Personal Information Manager (PIM) 146, and other modules 148. The device state module 142 provides persistence to ensure that important device data is stored in persistent memory, such as the flash memory 108, so that the data is not lost when the mobile device 100 is turned off or loses power. The address book 144 provides information for a list of contacts for the user. For a given contact in the address book, the information can include the name, phone number, work address and e-mail address of the contact, among other information. The other modules 148 may include a configuration module (not shown) as well as other modules that can be used in conjunction with the SIM/RUIM interface 128.

The PIM 146 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio 110 subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
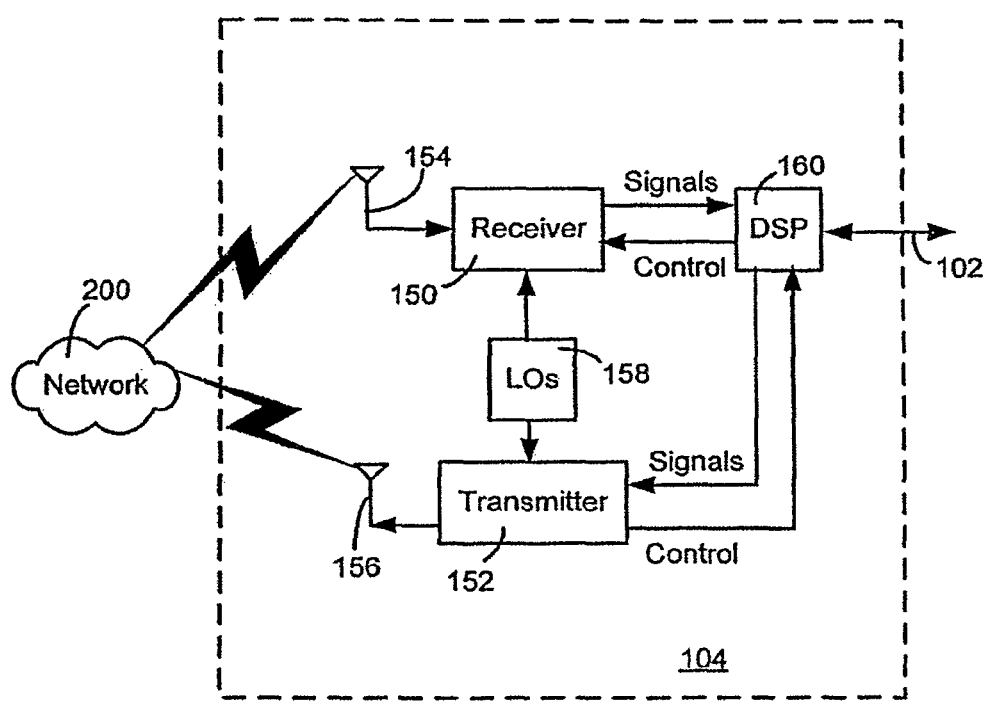
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150, which can perform common receiver functions such as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100. Accordingly, when the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
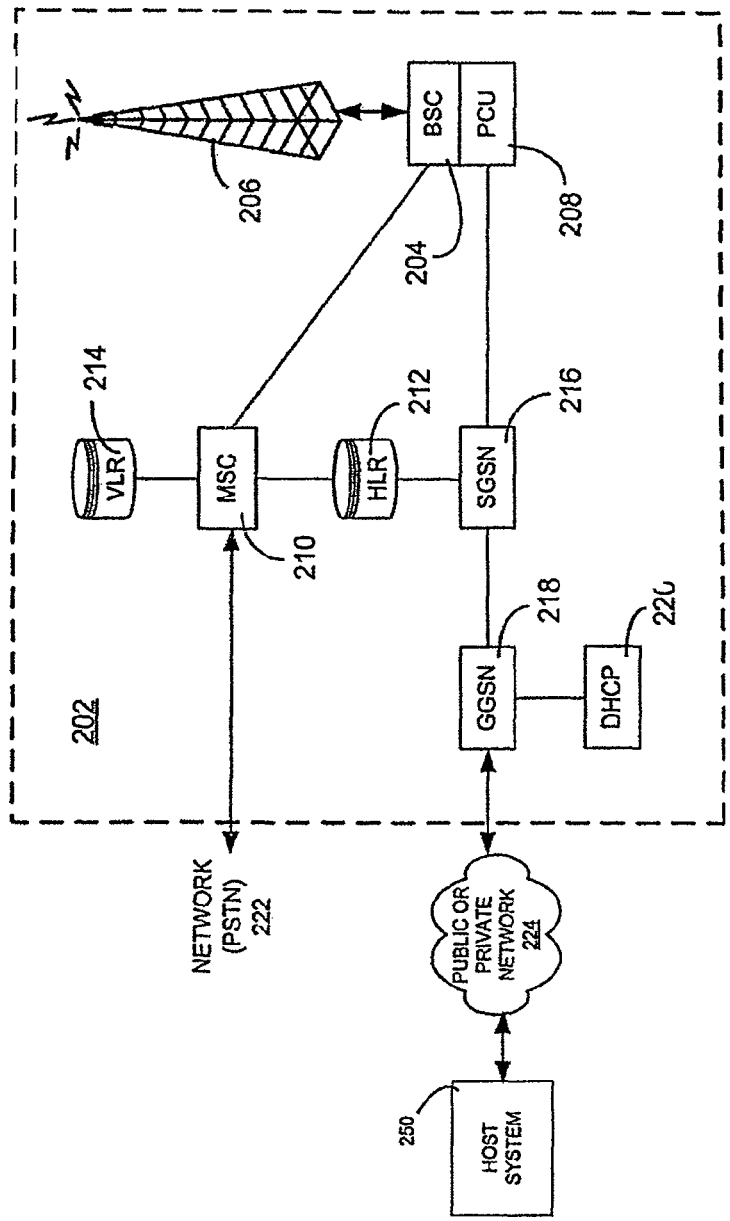

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit-switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and the DHCP server 220. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
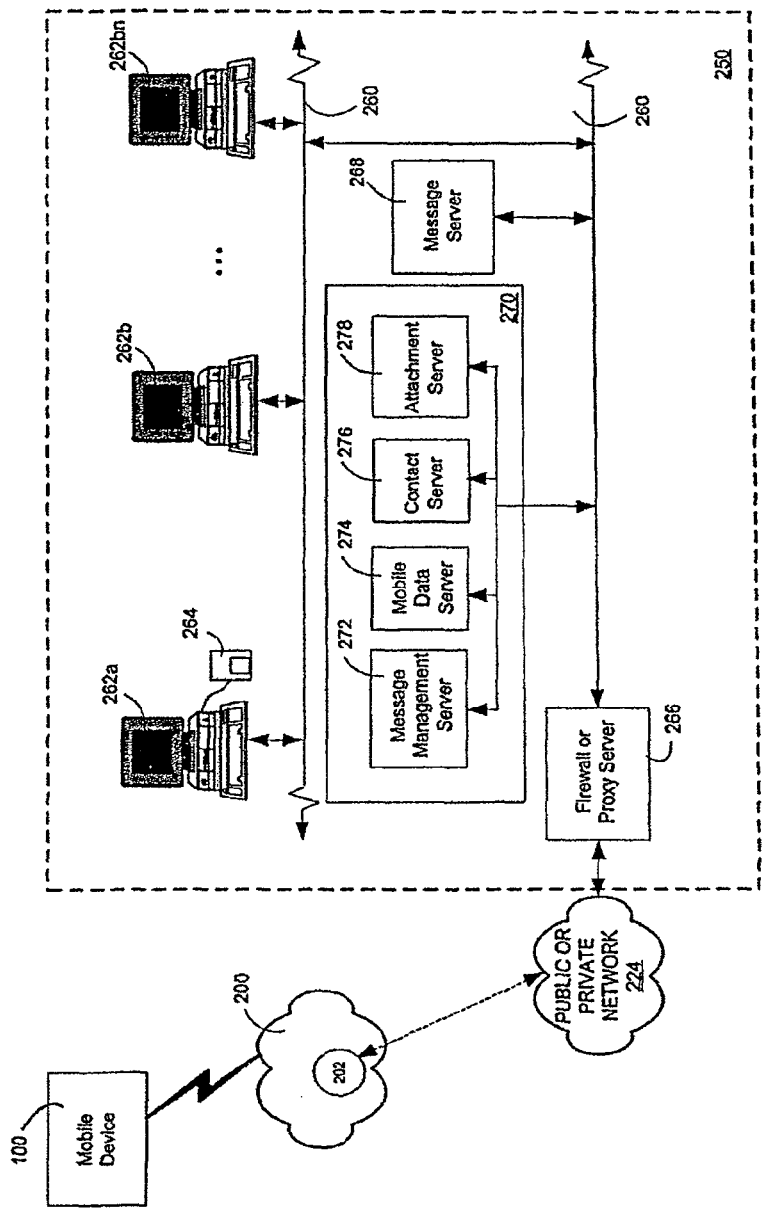

Referring now to FIG. 4, shown therein is a block diagram illustrating components of an exemplary configuration of a host system 250. In one instance, the host system 250 can be a corporate enterprise system. The host system 250 will typically be a corporate office or other local area network (LAN), but may also be a home office computer system or some other private system, for example, in variant implementations. In the example shown in FIG. 4, the host system 250 is depicted as a network of an organization to which a user of the mobile device 100 belongs. Typically, a plurality of mobile devices can communicate wirelessly with the host system 250 through one or more nodes 202.

The host system 250 comprises a number of network components connected to each other by the network connections 260, which can be LAN connections. For instance, a user's desktop computer 262a with an accompanying cradle 264 for the user's mobile device 100 is situated on a network connection 260. The cradle 264 for the mobile device 100 can be coupled to the computer 262a by a serial or a Universal Serial Bus (USB) connection, for example. Other user computers 262b-262b can also be situated on the network 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of the network components of the host system 250 is shown in FIG. 4 for ease of exposition. It will be understood by persons skilled in the art that, the host system 250 can include additional components that are not explicitly shown in FIG. 4 for this exemplary configuration. More generally, the host system 250 may represent a smaller part of a larger network (not shown) of the organization, and may include different components and/or be arranged in different topologies than that shown in the exemplary embodiment of FIG. 4.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 can act like a firewall and provides a secure node and a wireless internet gateway for the host system 250. The proxy server 266 intelligently routes data to the correct destination server.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or to a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In some embodiments, the data store may be a separate hardware unit (not shown) that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the handheld. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268, with certain processing being done for messages that contain attachment documents as described in more detail below.

To facilitate the wireless communication of messages and message-related data between the mobile device 100 and components of the host system 250, a number of wireless communication support components 270 can be provided. In at least some implementations, the wireless communication support components 270 can include a message management server 272, a mobile data server 274, a contact server 276, an attachment server 278, and the like.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are provided to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in one instance, when a message is initially retrieved by the mobile device 100 from the message server 268, the message management server 272 may push only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

In another instance, a given message can include an attachment document in which case the message management server 272 does not send the attachment document when the given message is first sent to the mobile device 100. Rather, the message management server 272 provides an indication that there is an attachment document when the given message is first sent to the mobile device 100. This indication may be graphical, such as a paperclip icon, or text-based, for example. If the user of the mobile device 100 wishes to view the attachment document, or one or more desired sections of the attachment document, then an attachment processing request is sent to the attachment server 278 with the desired processing task and attachment document information. In some cases, the attachment server can be associated with a separate website and provided by a corresponding web server that is not associated with the host system 250. In these cases, the message server 268 can be used to provide the selection and attachment document information to the website. The attachment server associated with the website then process the attachment document and sends the requested attachment information to the user of the mobile device 100.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications, and the like.

The contact server 276 can provide information for a list of contacts for the user similar to that provided by the address book 144 on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

The attachment server 278 receives requests from the mobile devices 100 to perform functions for e-mails that have an associated attachment document. These functions can include providing the full version of an attachment document, providing a selection dataset for the attachment document, and/or providing a table of contents for the attachment document (when applicable). In each of these cases, the full conversion of the attachment document, the table of contents for the attachment document and the selection datasets of the attachment document can be referred to as attachment data. The attachment server 118 can process many different types of documents such as Microsoft Office™ documents including Word, Excel and PowerPoint documents, as well as image, sound, vector and hybrid content files.

The attachment server 278 can receive an attachment processing request from the attachment content handling module 138 on the mobile device 100. The attachment server 278 operates in conjunction with the message server 268 to retrieve the particular attachment document and perform the attachment processing request. The attachment server 278 can then operate with the message server 268 and the message management server 272 to send the processed attachment information to the mobile device 100 that originally made the attachment processing request. The processed attachment information can be the full version of the attachment document, a selection dataset, or a table of contents that corresponds to the attachment document (this option is only applicable for certain attachment documents).

In the first case, when the full version of an attachment document is requested, the attachment server 278 processes the attachment processing request to determine the particular attachment document and the associated message. The attachment server 278 can use an identifier corresponding to the associated message to retrieve the attachment document from the message server 268, or an associated data store. The attachment server 278 along with the message server 268 and the message management server 272 sends the full version of the attachment document to the mobile device 100 that made the attachment processing request.

In the second case, when only one or more desired sections of the attachment document are requested, the attachment server 278 processes the attachment processing request to determine the particular attachment document, the associated message and attachment selection markers which indicate the one or more desired sections. The attachment server 278 can then use an identifier corresponding to the associated message to retrieve the specific attachment document from the message server 268, or an associated data store. The attachment server 278 then processes the attachment document to generate a selection dataset that corresponds to the one or more desired sections indicated by the attachment selection markers. The attachment server 278 along with the message server 268 and the message management server 272 then sends the selection dataset to the mobile device 100 that made the attachment processing request.

In the third case, when a table of contents for a text-based attachment document is requested, the attachment server 278 processes the attachment processing request to determine the particular attachment document, and the associated message. The attachment server 278 can then use an identifier corresponding to the associated message to retrieve the specific attachment document from the message server 268, or an associated data store. The attachment server 278 then processes the text-based attachment document to generate the table of contents. The attachment server 278 along with the message server 268 and the message management server 272 then sends the table of contents to the mobile device 100 that made the attachment processing request. Various techniques for the generation of the table contents are explained in U.S. patent application Ser. No. 10/693,736 which is hereby incorporated by reference.

It will be understood by persons skilled in the art that the message management server 272, the mobile data server 274, the contact server 276 and the attachment server 278 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported.

The attachment processing request made by the user of the mobile device can include attachment selection markers to identify the desired section(s) of the attachment content. These attachment selection markers include automatic and manual attachment selection markers. Automatic attachment selection markers can be embedded within the attachment processing request message and can be associated in the original message sent to the mobile device 100. Manual attachment selection markers can be embedded within the attachment document itself. Manual attachment selection markers can be used with certain types of attachment documents such as text documents, for example.

The attachment selection marker notifies the attachment server 278 of the sections of a particular attachment document that need to be processed to generate the selection dataset. Bookmarks can also be generated which point to two or more sections that are generated and placed within the selection dataset. The bookmarks can then be reviewed using the attachment reviewer 140.

Figure 5A:
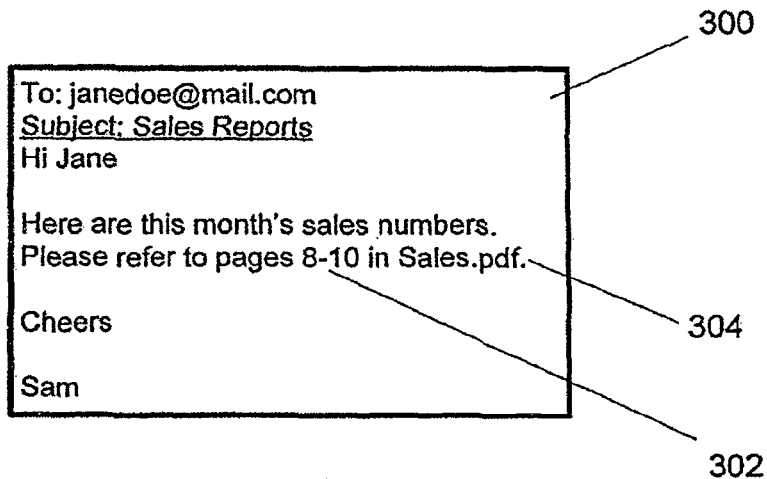
FIG. 5a is an illustration of an exemplary embodiment of a received message with embedded automatic attachment selection markers.

Referring now to FIG. 5*a*, shown therein is an illustration of an exemplary embodiment of a message 300 with embedded automatic selection markers that is received by the mobile device 100. In this case, the sender of the message 300 has embedded attachment selection markers 302 and 304 in the body of the message (note there may be other embodiments where the attachment selection markers are embedded in the subject line of the message). The attachment selection marker 304 identifies the attachment document that the user of the mobile device 100 is to review. The attachment selection marker 302 indicates the desired section of the attachment document that the user is to review.

The user of the mobile device 100 can then send an attachment processing request to the attachment server 278 to process the attachment document to generate the selection dataset. The user can make this request by selecting an appropriate menu choice associated with the message 300 (these menu choices are further discussed below). The attachment content handling module 138 is then invoked to send an attachment processing request to the attachment server 278. In some embodiments, the attachment content handling module 138 can send the attachment selection markers in the attachment processing request. In some embodiments, the attachment content handling module 138 can forward the message 300 that was received by the mobile device 100 in cases where the message 300 includes all of the attachment selection information (i.e. an identification of the attachment document and the desired sections).

Embedding the attachment selection markers within the attachment processing request allows the attachment server 278 to automatically parse the attachment processing request, and possibly the attachment document, and then process the attachment document according to the attachment processing request (i.e. full conversion, generation of a selection dataset, generation of table of contents, etc. for a given attachment document). One advantage of using automatic attachment selection markers is that since the desired region(s) can be specified in the body of the original message 300, and also the attachment processing request, the corresponding attachment documents do not need to be altered. A further advantage is that the automatic attachment selection markers are inconspicuously embedded in the original message 300. To a normal user, the automatic attachment selection markers may simply be considered to be normal text, but to the attachment server 278, they are special markers that are used for processing attachments to provide selection datasets and optionally corresponding bookmarks.

In general, the attachment processing request can be considered to include attachment selection information. In some cases, the attachment selection information can be included as automatic attachment selection markers in the actual attachment processing request. In other cases, the attachment selection information can be included as manual attachment selection markers in the attachment document. In other cases, the attachment selection information can be included as automatic attachment selection markers in the attachment processing request and as manual attachment selection markers in the attachment document.

In addition to e-mail messages, the attachment processing request may be one of an SMS message, a fax message, an instant message, and the like. Furthermore, in addition to a text document, the attachment document can also be a power point presentation, a picture, a series of pictures, a sound file, a series of sound files and the like.

Figure 5B:
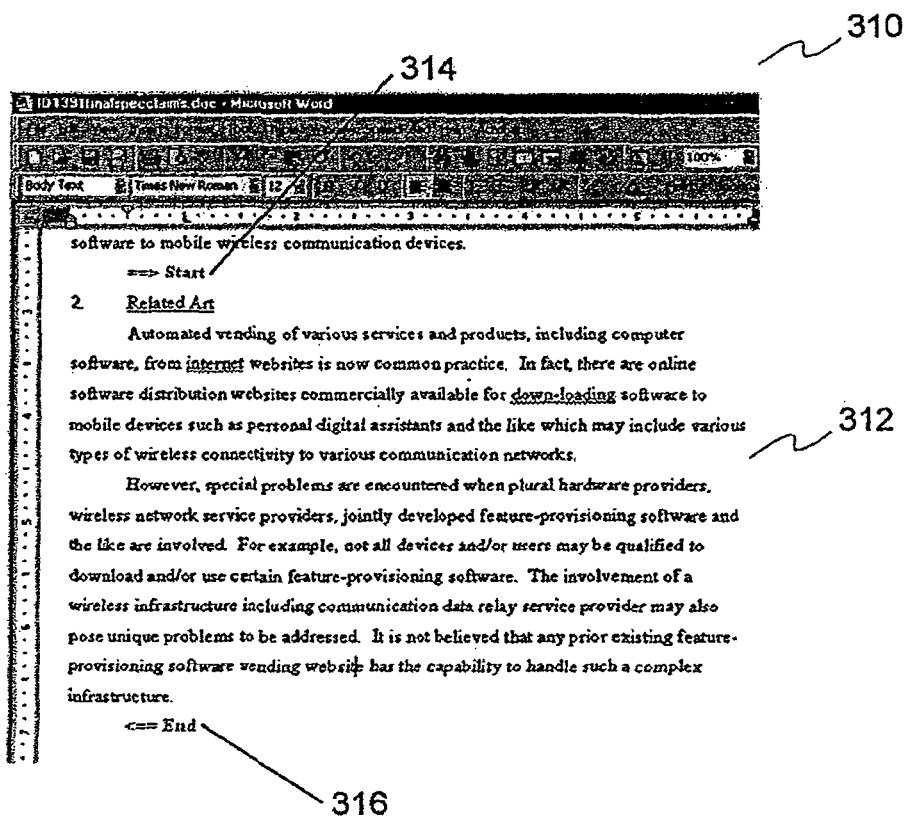
FIG. 5b is an illustration of an exemplary embodiment of an attachment document that includes embedded manual attachment selection markers.

Referring now to FIG. 5b shown therein is an illustration of an exemplary embodiment in which an attachment document 310 includes embedded manual attachment selection markers 314 and 316. The manual attachment selection markers are "manually" inserted into the attachment document 310 by the sender or by someone else that is associated with the attachment document 310. In this example, the attachment document 310 is a Microsoft™ Word document with a desired section 312 that requires review by the user of the mobile device 100. The desired section 312 is identified with Start and End markers 314 and 316 respectively. The Start marker 314 indicates to the attachment server 278 the starting point of the desired section, while the End marker 316 indicates to the attachment server 278 the end point of the desired section. In this exemplary embodiment, the symbols "==>Start" and "==>End" are used to indicate the Start and End markers 314 and 316. However, other symbols can also be used to indicate the Start and End markers 314 and 316. Further, there can be several pairs of Start and End markers 314 and 316 in the attachment document 310 to indicate several desired regions.

For both the automatic and manual attachment selection markers, identifiers other than page numbers can be used as a marker. For example, reference coordinates can also be used as attachment markers. This can depend on the format of the attachment document. For instance, the reference coordinates (x, y, w, h) can be used to point to a subset of an image. Other examples of markers include: a character or byte offset and a number of characters; a beginning and end percentage of the attachment document; or a start and end index in a sound file. This is not meant to be an exhaustive list of the type of markers that can be used but rather is given as an example. Those skilled in the art should understand that other types of markers can also be used.

The attachment server 278 can handle both automatic and manual attachment selection markers. When the attachment server 278 receives an attachment processing request, the attachment server 278 first scans the body of the attachment processing request to determine whether there are any automatic attachment selection markers. For example, with message 300, the attachment server 278 can recognize that the automatic attachment selection marker 304 identifies the document "sales.pdf" as the attachment document that requires processing. The attachment server 278 can also recognize that the automatic attachment selection marker 302 identifies that pages 8-10 delimits the desired section that requires processing to generate the selection dataset. To accomplish this "recognition task", the attachment server 278 can parse the attachment processing request, or use some other suitable processing technique. The attachment server 278 performs the requested processing and then sends an e-mail with the selection dataset(s) to the mobile device 100 that sent the attachment processing request.

If the attachment server 278 does not locate any automatic attachment selection markers within the body of the attachment processing request, but locates the identification of the attachment document, then the attachment server 278 searches within the attachment document to determine if there are manual attachment selection markers embedded within the attachment document. For each attachment document in which the attachment server 278 locates the manual attachment selection markers, the attachment server 278 processes the attachment documents to provide the desired selection dataset(s). The attachment server 278 then sends an e-mail with the selection dataset(s) to the mobile device 100 that sent the attachment processing request. If no manual attachment selection markers are found, or no attachment documents are identified, then the attachment server 278 can return an error message to the mobile device 100 from which the attachment processing request originated.

Figure 6:
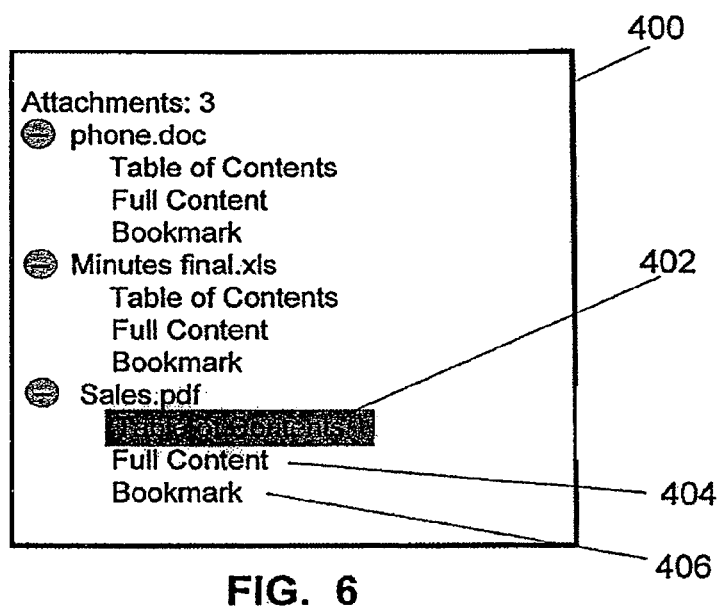
FIG. 6 is an illustration of an exemplary embodiment of an attachment information window that is associated with a message that includes several attachments.

Referring now to FIG. 6, shown therein is an illustration of an exemplary embodiment of an attachment information window 400 that corresponds to a message that includes several attachments. The message is received by a user of the mobile device 100 and has an associated icon indicating that the message includes an attachment document. The user then chooses an option to view one or more of the attachment documents. The attachment content handling module 138, in conjunction with the message application 136, then displays the attachment information window 400 which lets the user know what the attachment documents are and which reviewing options are available for the attachment documents (the word review is used here since the attachment document can be text that the user reads, an image that the user views or a sound file that the user listens to; the actions of reading, viewing and listening can all be considered part of reviewing the attachment document).

The attachment window 400 displays all of the attachment documents that are associated with the message. In this example, the message includes 3 attachment documents: "phone.doc", "Minutes final.xls", and "sales.pdf". In some embodiments, the review options include a table of contents viewing option 402, in which the user can request that the attachment server 278 generates a table of contents for an attachment document and provide the table of contents for review at the mobile device 100. The review options can also include a full content viewing option 404, in which the user can request that the attachment server 278 provide an entire attachment document for review at the mobile device 100. The review options can also include a bookmark viewing option 406, in which the user can request that the attachment server 278 process and provide one or more selection datasets for an attachment document and send these datasets to the mobile device 100 for review. It should be noted that all of these review options may not be available for a given attachment document. Further, other review options may be possible such as listening to a sound file or viewing an image file, and the like.

In the exemplary embodiment shown in FIG. 6, the user can select the attachment document for which further information is desired. The list can then be expanded to show the viewing options that are available for the selected attachment document. The user can then highlight the review option that is desired for the selected attachment document. In this example, the list has been expanded for all of the attachment documents.

Other variations of the attachment information window 400 are also possible. For example, a list of attachment documents can be shown and the review options (i.e. Table of Contents 402, Full Content 404, Bookmark 406, etc.) can be shown at the bottom of the window in a row or at the side of the window as a column. The user can then highlight the desired attachment document, and then select the desired review option. If that particular review option is not available, then the attachment content handling module 138 can provide an error message to the user or once of the user selects a desired attachment document, the attachment content handling module 138 can dynamically display the review options that are available for the selected attachment document.

Once the user has selected a review option for an attachment document, the attachment content handling module 138 can query the user to determine if the user wishes to forward the received message as is to the attachment server 278 for processing. This case is acceptable in scenarios in which the received message already includes automatic attachment selection markers. This scenario can also be selected as a default when the user receives a message with only one attachment document and the message already includes automatic attachment selection markers. In this case, in some embodiments, the user can use a particular key on the keyboard 116 to forward the message to the attachment server 278. Also for this case, in some embodiments, the message application 136 can provide an "e-mail address" for the attachment server 278 in the address book 144 and the user can choose to forward the message and then select the e-mail address for the attachment server 278. This option of "quick forwarding" can also be used in cases where there is one attachment document and the user knows that manual attachment selection markers have already been included in the attachment document. In each of these "quick forwarding" scenarios, the attachment content handling module 138 can simply use the received message as the attachment processing request and send the message to the attachment server 278. In other embodiments, the attachment content handling module 138 can automatically generate the processing request once the user selects an attachment document and a review option.

In other cases, the attachment content handling module 138 can query the user for the attachment selection information once the user has selected the bookmark viewing option 406 for an attachment document. The attachment content handling module 138 can provide a dialog box with text boxes where the user can indicate the starting and ending sections for one or more desired sections. The attachment content handling module 138 can then generate the attachment processing request in a similar form to that of message 300, in some cases, and embed the attachment selection information as automatic attachment selection markers in the attachment processing request. The attachment content handling module 138 then sends the attachment processing request to the attachment server 278 for processing.

Figure 7:
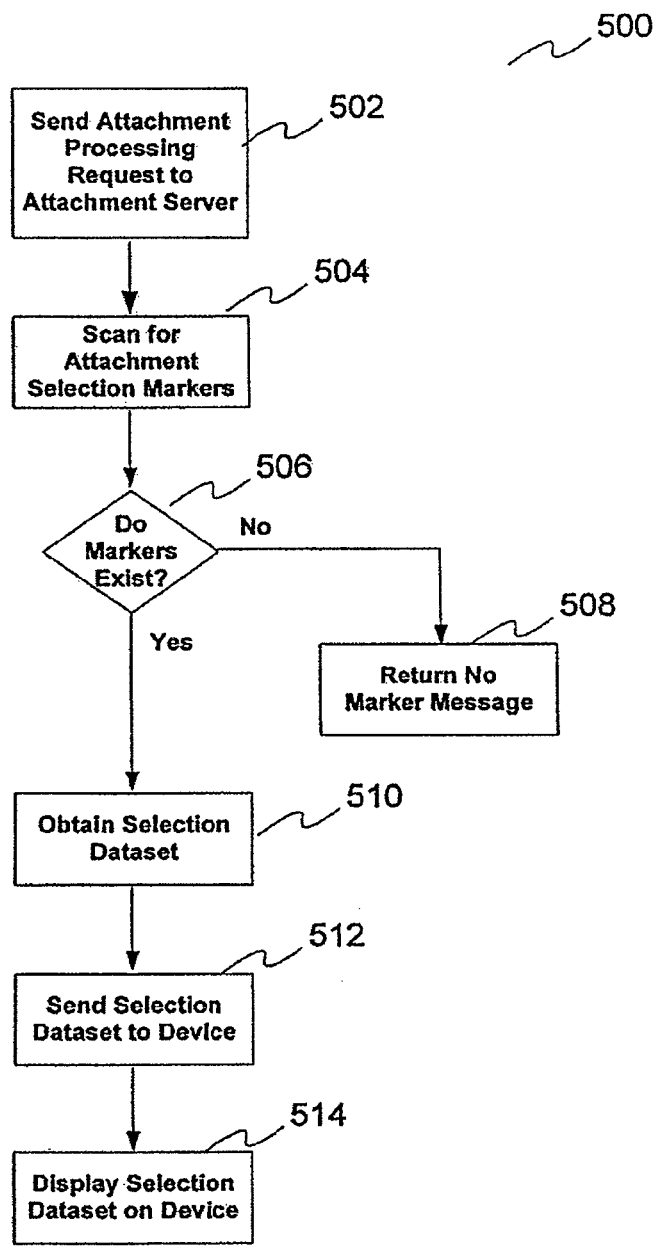

Referring now to FIG. 7, shown therein is a flowchart diagram illustrating an exemplary embodiment of an attachment handling process 500 for processing attachment processing requests that request selection datasets. At step 502, the attachment server 278 receives an attachment processing request. At step 504, the attachment server 278 scans or parses the attachment processing request to determine the identity of the attachment document and the attachment selection information. If automatic attachment selection markers are found to be embedded in the attachment processing request, then the process 500 moves to step 510. If automatic attachment selection markers are not embedded in the attachment processing request, then the attachment server 278 interacts with the message server 268 and possibly one or more associated data stores to retrieve the attachment document. The attachment server 278 then scans the attachment document to determine whether it includes manual attachment selection markers. If manual attachment selection markers are not found, then the process 500 moves to step 508 and the attachment server 278 can send a message to the mobile device 100 that sent the attachment processing request indicating that no attachment selection information was found.

At step 510, the attachment server 278 processes the attachment document to obtain the selection dataset according to the attachment selection information. At this step, the attachment server 278 may have to retrieve the attachment document if automatic attachment selection markers were included in the attachment processing request. Various possibilities exist for processing the attachment document. For instance, if the attachment document is a text document, then the attachment server 278 extracts the portions of text indicated by the attachment selection information. This can include one or more pages, paragraphs, sentences or lines of text. If the attachment document is an audio file, then the attachment server 278 can extract desired tracks or portions of audio. If the attachment document is a series of images, the attachment server 278 can select a subset of desired images. If the attachment document is a single image, then the attachment server 278 can select a portion of the image.

At step 512, the attachment server 278 sends the selection dataset to the mobile device 100 that sent the attachment processing request. The attachment content handling module 138 in combination with the attachment reviewer 140, then provides the selection dataset to the mobile device 102 in step 514.

In some embodiments, the process 500 can include scanning for both automatic and manual attachment selection markers since both of these markers can be used for a given attachment document. For example, a given attachment document can include manual attachment selection markers that identify one desired section in the given attachment document. However, the user, or someone else, can specify automatic attachment selection markers that identify additional desired sections in the given attachment document that are to be included in the selection dataset.

Figure 8:
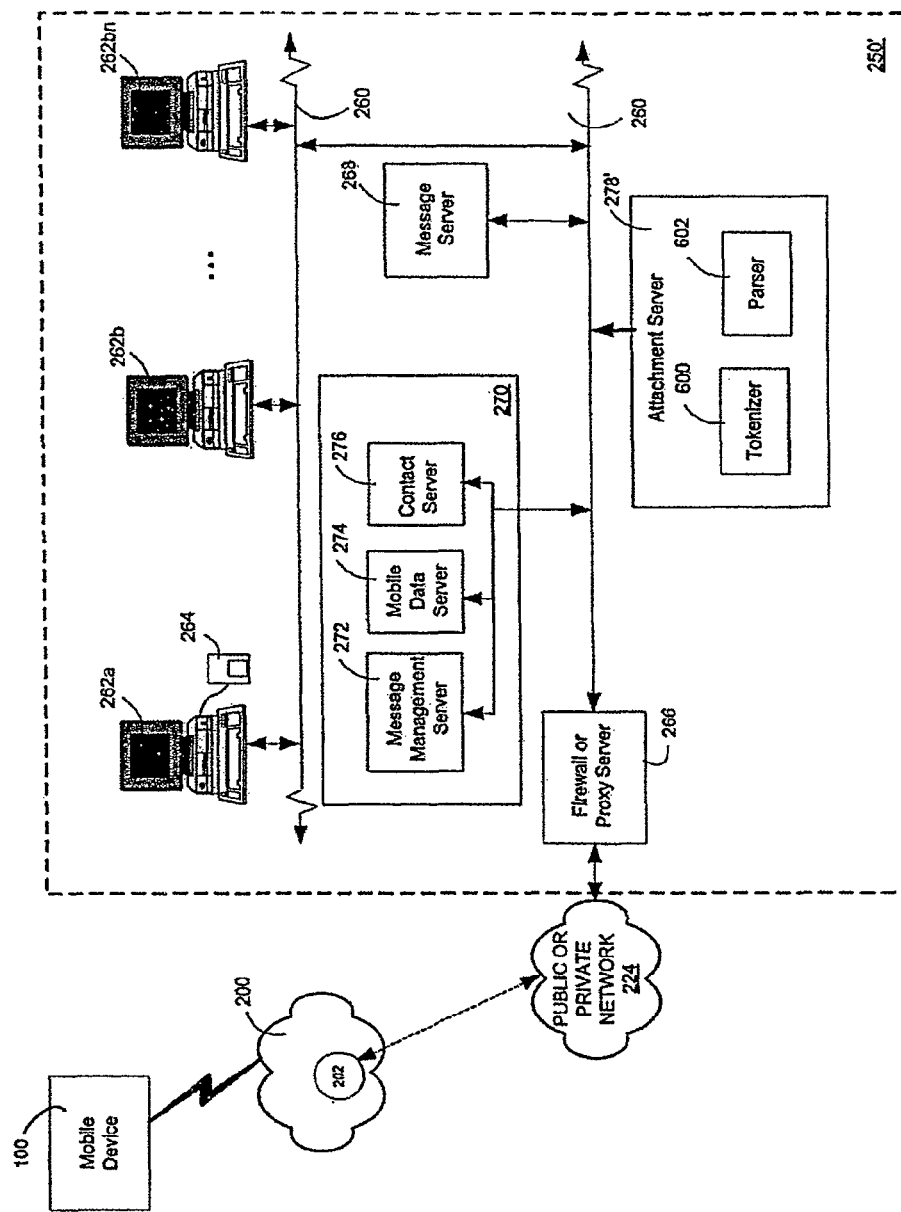

Referring now to FIG. 8, shown therein is a block diagram of another exemplary embodiment of a host system 250' including an attachment server 278' that can accommodate attachment processing requests. The attachment server 278' includes a tokenizer 600 and a parser 602 for scanning attachment processing requests to determine the type of attachment processing that is requested and performing the requested action. In some implementations, the tokenizer 600 and parser 602 can also be used to scan attachment documents that include manual attachment selection markers. The tokenizer 600 scans the body of the attachment processing request and identifies, selects, and tags reserved words as identified tokens for further consideration by the parser 602. The parser 602 then validates the arrangement of the identified tokens with respect to rules in a grammar, and upon validation of a given rule, executes an action. In some embodiments of the parser 602, exemplary grammar rules can include the rules: <-, <region>, <number>, <range>, <number>, <table of content entry>, ->, {add entry into table of contents}, and {generate dataset selection}.

One exemplary action is reduction in which the parser 602 builds up expressions from identified tokens, and combinations of identified tokens and expressions, and replaces the input with another expression. Reduction preferably continues until a terminal expression is encountered, at which point a terminal action is taken by and the parser 602. An example of a terminal expression is "table of contents entry", which has the associated action "add entry to table of contents".

In some implementations of the tokenizer 600, the reserved words can include document region reserved words, range defining reserved words, and number reserved words. Examples of document region reserved words include "page", "section", "line", "region", "table", "image", "pixel" and generally any word that can be used to represent a region within an attachment document, or a collection of attachment documents. Examples of range defining reserved words include "from", "to", "-", "as of", "until" and generally any input that can be used to define a range within an attachment document or collection of attachment documents. Examples of number reserved words include: a) Arabic numbers such as "1", "2", "3", b) Roman numerals such as "i", "ii", "ix", c) sectional number words such as "a)", "1 c", "1a", "3.5", "A.1.c", d) absolute number words such as "one", "seven", "forty three", and e) relative number words such as "first", "last", and the like. Generally, a number word is any input that can be used to delimit a specific region of interest within an attachment document. It should be noted that the lists of document region reserved words, range defining reserved words, and number reserved words serve as examples only and are not meant to limit the scope of the embodiments described herein. Those skilled in the art may be able to come up with other examples.

As an example of the tokenizer 600 and the parser 602 in use, consider an attachment processing request that includes the text: "please review pages 10-12". The output from the tokenizer 600 can be "please review <region: pages> <number: 10> <range: -> <number: 12>". This output is then provided to the parser 602 which then validates that the collection of tokens <region: pages>, <number: 10>, <range: ->, <number: 12>, matches the rules in the grammar, and if so, then performs a reduction action to build the expression "<table of contents entry selection: pages 10-12>". The parser 602 then validates that the expression "<table of contents entry selection: pages 10-12>" matches a corresponding rule in the grammar, and if so, then performs the "dataset selection" action. The attachment server 278' then provides the dataset selection to the mobile device 100 that made the attachment processing request. This is an example of an implementation in which a table of contents is generated for a text-based attachment document along with a dataset for an entry in the table of contents. The table of content entry is then provided to the mobile device that made the attachment processing request.

In other embodiments, the "dataset selection" action can point to the beginning of the region of interest, such as page 10 in the example above. Upon request of that particular desired section made by the user, the attachment server 278 can send a first portion: page 10 in this example. By interactive operation the user can then get the subsequent page in the desired section by requesting "more date". This option can be provided by the attachment reviewer 140 which then notifies the attachment content handling module 138 if the user requests more data. The attachment content handling module 138 then provides this request to the attachment server 278. The advantage of this approach is that only the beginning of the desired section is sent to the mobile device 100, thereby saving communication resources in the event that the user does not view the entire desired section. However, the user is provided with the flexibility of continually requesting more data if the user wishes to view more of the desired section.

The attachment selection markers can be collectively referred to as attachment selection information. Further, in some embodiments, start and end attachment selection markers may not be needed. For instance, some one can specify only a start marker and it is understood that the desired section starts from the start marker and finishes at the end of the attachment document. Alternatively, one can specify only an end marker and it is understood that the desired section starts at the beginning of the attachment document and ends at the end marker. The text "start" and "end" or other similar identifiers can be used to identify whether a single marker is a start marker or an end marker. This feature can be applied to text documents, power point presentations, audio files, video files, an array of images and a single image. In the case of a single image, a single marker can be a row or column number that acts as a start or an end marker. In the case of a column marker, the left edge of the image can arbitrarily be chosen as the starting point for the image. In the case of a row marker, the top edge of the image can arbitrarily be chosen as the starting point for the image.

Various methods, systems and devices are described herein that can facilitate the processing of an attachment document for downloading and viewing on a mobile device.

In one aspect, at least one embodiment described herein provides a method of generating attachment data at an attachment server for a given attachment document associated with a message received on a mobile device. The method comprises:

a) receiving an attachment processing request from the mobile device; processing the attachment processing request to identify the given attachment document;

b) retrieving the given attachment document;

c) processing one of the attachment processing request and the given attachment document to obtain attachment selection markers for identifying a desired section of the given attachment document for which the attachment data is generated; and, d) processing the given attachment document according to the attachment selection markers to generate a selection dataset for the attachment data.

In some cases, prior to step a) at the mobile device, the method further includes:

i) obtaining an indication of the given attachment document;

ii) generating the attachment processing request based on at least the indication of the given attachment document; and, iii) sending the attachment processing request to the attachment server for processing the given attachment document.

In at least some cases, step ii) further includes providing one or more automatic attachment selection markers in the attachment processing request.

In at least some cases, step d) includes scanning the attachment processing request to identify one or more automatic attachment selection markers.

In at least some cases, step d) includes scanning the given attachment document to identify one or more manual attachment selection markers.

In at least some cases, steps b) and d) of the method include using a tokenizer to identify tokens in the attachment processing request and a parser for generating a terminal expression based on the tokens, and the method further includes taking action based on the terminal expression for generating the selection dataset.

In at least some cases, the tokenizer identifies tokens belonging to at least one of document region reserved words, range defining reserved words, and number reserved words.

In at least some cases, step e) includes providing a first portion of the selection dataset as the attachment data and providing further portions of the selection dataset for subsequent portions of attachment data in response to requests for further attachment data.

In another aspect, at least one embodiment described herein provides a mobile device for reviewing attachment data for a given attachment document associated with a message received on a mobile device. The mobile device comprises a main processor that controls the operation of the communications device; a communication subsystem connected to the main processor; a message application that interfaces with the communication subsystem to send and receive data associated with the given attachment document; an attachment content handling module for generating an attachment processing request for the attachment data, the attachment content handling module interfaces with the message application and the communication subsystem to send the attachment processing request to an attachment server, the attachment processing request including an indication of the given attachment document, and attachment selection information for identifying a desired section of the given attachment document for which the attachment data is generated; and, an attachment reviewer for reviewing the attachment data.

In at least some cases, the attachment selection information includes one or more automatic attachment selection markers in the attachment processing request.

In at least some cases, the attachment selection information includes one or more manual attachment selection markers in the given attachment document.

In at least some cases, the attachment processing request is one of an e-mail message, an SMS message, a fax message, a paging message, and an instant message.

In yet another aspect, at least one embodiment described herein provides a system for providing attachment data for a given attachment document associated with a message. The system comprises: a mobile device that receives the message, the mobile device including an attachment content handling module for generating and sending an attachment processing request for the attachment data, the attachment processing request including an indication of the given attachment document, and attachment selection information for identifying a desired section of the given attachment document for which the attachment data is generated; and, an attachment server wirelessly coupled to the mobile device for processing the attachment processing request to provide the attachment data to the mobile device.

In at least some cases, the attachment server processes the attachment processing request to identify and retrieve the given attachment document, to obtain attachment selection markers for identifying the desired section of the given attachment document for which the attachment data is generated, processing the given attachment document according to the attachment selection markers to generate a selection dataset for the attachment data, and sending the selection dataset to the mobile device.

In at least some cases, one or more automatic attachment selection markers are provided in the attachment processing request.

In at least some cases, one or more manual attachment selection markers are provided in the given attachment document.

In at least some cases, the attachment server includes a tokenizer for identifying tokens in the attachment processing request and a parser for generating a terminal expression based on the tokens, and the attachment server takes action based on the terminal expression for generating the selection dataset.

In at least some cases, the attachment server provides a first portion of the selection dataset as the attachment data and provides further portions of the selection dataset for subsequent portions of the attachment data in response to requests for further attachment data.

In at least some cases, the attachment server is associated with one of a corporate enterprise and a website on the Internet.

In at least some cases, the mobile device further includes an attachment reviewer for reviewing the selection dataset on the mobile device.

It should be understood that various modifications can be made to the embodiments described and illustrated herein, without departing from the embodiments, the general scope of which is defined in the appended claims.

The invention claimed is:

1. A method of generating attachment data at an attachment server for a given attachment document associated with a message received on a mobile device with an indication of the given attachment document, the method comprising:

a) automatically generating an attachment processing request at the mobile device based on the message received, the message comprising embedded automatic attachment selection markers comprising tokens belonging to document region reserved words and number reserved words, wherein the automatic attachment selection markers are normal text to the mobile device and are special markers to the attachment server, the attachment processing request comprising one or more of the automatic attachment selection markers;
b) receiving the attachment processing request at the attachment server;
c) processing the attachment processing request to identify the given attachment document and retrieve the given attachment document;
d) processing the attachment processing request and the given attachment document to obtain the automatic attachment selection markers for identifying a desired section of the given attachment document for which the attachment data is to be generated based on the document region reserved words and the number reserved words;
e) processing the given attachment document according to the automatic attachment selection markers to generate a selection dataset for the attachment data; and
f) returning the selection dataset to the mobile device.

2. The method of claim 1, wherein said tokens further comprise range defining reserved words.

3. A method of generating attachment data at an attachment server for a given attachment document associated with a message received on a mobile device with an indication of the given attachment document, the method comprising:
a) receiving an attachment processing request automatically sent from the mobile device based on the message comprising embedded automatic attachment selection markers;
b) processing the attachment processing request to identify and retrieve the given attachment document;
c) processing the attachment processing request and the given attachment document to obtain the attachment selection markers for identifying a desired section of the given attachment document for which the attachment data is to be generated to identify tokens in the attachment processing request belonging to document region reserved words and number reserved words and generate a terminal expression based on the tokens, wherein the attachment selection markers are normal text to the mobile device and are special markers to the attachment server;
d) processing the given attachment document according to the attachment selection markers to generate a selection dataset for the attachment data;
e) taking action based on the terminal expression for generating the selection dataset; and
f) returning the selection dataset to the mobile device.

4. The method of claim 3, wherein said tokens further comprise range defining reserved words.

5. A mobile device for reviewing attachment data for a given attachment document associated with a message received on a mobile device with an indication of the given attachment document, the mobile device comprising:
a) a main hardware processor that controls operation of the mobile device;
b) a communication subsystem connected to the main processor for receiving the message, the message comprising automatic attachment selection markers;
c) a message application that interfaces with the communication subsystem to send and receive data associated with the given attachment document;
d) an attachment content handling module configured to automatically generate an attachment processing request for the attachment data, the attachment content handling module interfacing with the message application and the communication subsystem to send the attachment processing request to an attachment server, the attachment processing request including the indication and attachment selection information for identifying a desired section of the given attachment document for which the attachment data is to be generated, wherein the attachment selection information includes the automatic attachment selection markers in the attachment processing request, and wherein the automatic attachment selection markers comprise tokens belonging to document region reserved words and number reserved words, wherein the automatic attachment selection markers are normal text to the mobile device and are special markers to the attachment server, and wherein the attachment server is enabled to process the attachment processing request according to the selection markers to generate the desired section and return the desired section to the mobile device; and
e) an attachment reviewer for reviewing the desired section.

6. The method of claim 1, wherein said tokens further comprise range defining reserved words.

7. A system for providing attachment data for a given attachment document associated with a message and an indication of the given attachment document, wherein the system comprises:
a) a mobile device that receives the message with the indication, the message comprising attachment selection information, the mobile device including an attachment content handling module configured to automatically generate and send an attachment processing request for the attachment data, the attachment processing request including the indication and the attachment selection information for identifying a desired section of the given attachment document for which the attachment data is to be generated; and
b) an attachment server wirelessly coupled to the mobile device configured to process the attachment processing request to provide the attachment data to the mobile device, further to process the attachment processing request according to the attachment selection information to generate the desired section and to return the desired section to the mobile device, wherein the attachment selection information comprising tokens belonging to document region reserved words and number reserved words, wherein the attachment server is enabled to identify tokens in the attachment processing request and generate a terminal expression based on the tokens, and wherein the attachment server takes action based on the terminal expression for generating a selection dataset, wherein the attachment selection information are normal text to the mobile device and are special markers to the attachment server.

8. The method of claim 7, wherein said tokens further comprise range defining reserved words.

* * * * *